United States Patent [19]

Kress

[11] Patent Number: 5,688,851

[45] Date of Patent: Nov. 18, 1997

[54] GEL COAT AND METHOD FOR MANUFACTURE THEREOF

[75] Inventor: Russell L. Kress, Rowley, Iowa

[73] Assignee: Ceramal Research & Development Corporation, Rowley, Iowa

[21] Appl. No.: 529,620

[22] Filed: Sep. 18, 1995

[51] Int. Cl.$^6$ ............................... C08K 3/20; C09D 5/10
[52] U.S. Cl. .................... 524/430; 524/437; 524/441; 524/444; 524/265; 524/266; 523/216; 523/171; 523/514
[58] Field of Search ............................ 524/430, 437, 524/441, 444, 265, 266; 523/216, 171, 514

[56] References Cited

U.S. PATENT DOCUMENTS

| | | | |
|---|---|---|---|
| 3,893,488 | 7/1975 | Rogers et al. | 138/141 |
| 3,917,790 | 11/1975 | Oswitch | 264/267 |
| 4,139,519 | 2/1979 | Itoh et al. | 260/42.26 |
| 4,179,537 | 12/1979 | Rykowski | 427/387 |
| 4,247,364 | 1/1981 | Culp | 428/283 |
| 4,349,605 | 9/1982 | Biggs et al. | 428/389 |
| 4,410,642 | 10/1983 | Layton | 523/122 |
| 4,428,989 | 1/1984 | Marshall | 428/35.8 |
| 4,463,041 | 7/1984 | Hiroyuki | 428/34.5 |
| 4,486,179 | 12/1984 | Brauer et al. | 523/116 |
| 4,568,604 | 2/1986 | Kurtz et al. | 428/297 |
| 4,724,173 | 2/1988 | Rockette et al. | 427/389.8 |
| 4,742,121 | 5/1988 | Toman | 524/531 |
| 4,904,721 | 2/1990 | Hanaoka et al. | 524/266 |
| 4,916,023 | 4/1990 | Kawabata | 428/482 |
| 4,970,126 | 11/1990 | Adaniya et al. | 428/623 |
| 5,021,091 | 6/1991 | Takarada et al. | 106/287.16 |
| 5,087,405 | 2/1992 | Maker | 264/255 |
| 5,164,127 | 11/1992 | Boeckeler | 264/22 |
| 5,166,008 | 11/1992 | Tomida | 429/137 |
| 5,324,757 | 6/1994 | Ohkawa et al. | 523/514 |
| 5,344,704 | 9/1994 | O'Dell et al. | 428/323 |
| 5,346,968 | 9/1994 | Haas | 525/431 |
| 5,362,692 | 11/1994 | Bugajski et al. | 501/103 |
| 5,376,427 | 12/1994 | Singh | 428/110 |
| 5,382,309 | 1/1995 | Seibold | 156/242 |
| 5,385,973 | 1/1995 | Maciandi et al. | 524/730 |
| 5,405,571 | 4/1995 | Truekner | 419/8 |

OTHER PUBLICATIONS

Merck Index, (1989 Ed.) Paragraph 1714 "Calcium Silicate (Wollastonite)", p. 257.

Primary Examiner—Vasu S. Jagannathan
Assistant Examiner—Olga Asinovsky

[57] ABSTRACT

An improved gel coat for integral molded products having increased hardness consists of a synthetic resin mixed with tabular alumina and a surface treating agent such as gamma-Methacryloxypropyltrimethoxysilane. The gel coat may be applied as a first layer over a mold, pattern, part, or other surface with a filler reinforced resin layer applied to the first layer or with an intermediate layer of resin filled with calcium silicate applied between the gel coat and the reinforced layer. The gel coat may also be used as a surface coating for steel, composite, and concrete structures.

13 Claims, No Drawings

GEL COAT AND METHOD FOR MANUFACTURE THEREOF

BACKGROUND OF THE INVENTION

This invention relates to the art of molding of composite products

Composite products formed by the solidification of resins applied to a structure such as a mold, pattern, part, or other surface are made by first applying a release agent followed by a resinous coating, referred to as the gel coat, to the structure. The gel coat becomes the outer skin of the finished product. It typically is allowed to solidify partly before application to the structure of other reinforced resin mixes such as those filled with glass fiber.

In U.S. Pat. No. 4,568,604, an improvement to the composite molding art is described wherein an intermediate layer of filled resin is applied to the mold over the gel coat and before the glass fiber layers are added. The application of this intermediate filled layer is useful to reduce air voids which develop between the gel coat and the glass fiber layers and thereby to minimize the air bubbles which are trapped when glass fiber "chop" is sprayed onto the gel coat. The disclosure of this patent does not address the manufacture of a hardened gel coat.

Existing gel coat materials are suitable for many products which are not subjected to extremes of surface wear. However, existing gel coats are subject to damage when the product is removed from the mold, pattern, part, or other surface. Many products are extracted from the mold by prying and other methods to wedge a separator between the product and the mold or other structure.

There is a need to provide gel coat materials which result in a finished product having an outer surface which is very hard and durable and which can withstand procedures to remove the composite product from the mold without damage to the product's outer surface. A resin-based coating composition that has an excellent storage stability, can be hardened at low temperatures and can form a coating layer superior in heat resistance, water resistance, solvent resistance, corrosion resistance, friction resistance, weather resistance, with superior adhesion, hardness and smoothness is needed.

An effort to provide an electrically conductive polymeric coating for ship hulls is disclosed in U.S. Pat. No. 4,428,989 which describes a cured resin formed of epoxy resin coreacted with an epoxidized polyol and a curing agent, the resin containing pretreated copper flake being fifty percent or more by weight of the cured surface coat.

The disclosure of U.S. Pat. No. 5,087,405 describes a method to protect a gel coat against weathering by providing a protective overlay coat to the gel coat during the molding process.

A high scratch resistant surface coat for use in marine applications or in the manufacture of synthetic marble is described in U.S. Pat. No. 5,164,127 where a first layer is partially cured in the mold, pattern, part, or other surface with a second gel coat then applied and partly cured and with a fiber reinforced resin applied and final curing accomplished.

U.S. Pat. No. 4,904,721 describes a coating containing organoalkoxysilane and colloidal alumina sol of the general formula $Al(OR^2)_3$ where $R^2$ is an alkyl group specified in the patent.

The disclosure of U.S. Pat. No. 5,385,973 teaches a process for a composition including a mineral filler, silanizing agent and a hydrolysis catalyst mixed with a monomer.

U.S. Pat. No. 5,021,091 discloses a hard coating of an organic silicon and submicron silica sol or antimony, oxide sol improved in curing properties and shelf stability.

An antifouling composition including heavy metals in a specified resin matrix is disclosed in U.S. Pat. No. 4,410,642.

The aforementioned references fail to disclose a resin based, low temperature curing gel coat with superior hardness and smoothness which may be achieved with simplified process means.

SUMMARY OF THE INVENTION

The present invention provides a gel coat which may be applied to a mold, pattern, part, or other surface by spraying or other application and which results in a very hard outer surface of the part which is very resistant to damage.

In the preferred embodiment, a suitable resinous gel coat is filled with hardener and surface modification materials which are satisfactorily dispersed in the resin matrix and which still maintain adequate fluidity to allow the gel coat resin to be sprayed onto the mold, pattern, part, or other surface. After the preferred embodiment gel coat is applied to the mold, pattern, part, or other surface, Fiberglas™ chop or other glass fiber and resin mixtures, or other composites, may be sprayed or otherwise applied to the gel coat layer. The filled intermediate layer of resin disclosed in U.S. Pat. No. 4,568,604 is also preferably applied between the preferred embodiment gel coat and a glass fiber chop layer.

The improved gel coat comprises a resin mixed with tabular alumina ($Al_2O_3$) and a coupling agent from the group consisting of silanes, titanates, and zircoaluminates in proper concentration. The surface modifier gamma-Methacryloxypropyltrimethoxysilane has been used due to its availability at a favorable cost. Wollastonite is added for many applications. The resin selected may be of many types, including epoxies, polyesters, vinyl esters, and combinations of polyesters and vinyl esters. Optional pigments may be added. A prior art catalyst is introduced into the filled resin matrix and the resulting gel coat may be sprayed or otherwise applied to the mold, pattern, part, or other surface before application of other composite layers. When the intermediate filled layer described in U.S. Pat. No. 4,568,604 is used between the gel coat layer and a glass fiber layers, the mineral Wollastonite is preferably added to the preferred embodiment gel coat mix.

It is an object of the invention to provide a gel coat which is characterized by high hardness and durability.

It is another object of the invention to provide a gel coat which is not susceptible to damage when the work piece is removed from the mold.

It is another object of the invention to provide a resin based coating superior in heat resistance, water resistance, solvent resistance, corrosion resistance, friction resistance, weather resistance, and absorbability and transmission of heat and light, adhesion, hardness and smoothness.

It is a further object of the invention to provide a filled gel coat mixture of sufficient fluidity that it can be sprayed.

It is a further object of the invention to provide a gel coat which will adhere to a resin matrix layer with minimal entrapment of air bubbles between the gel coat and the resin matrix layer.

It is a further object of the invention to provide a wear resistant coating for tooling in various applications.

DETAILED DESCRIPTION OF THE INVENTION

The present invention pertains to an improved gel coat for molded products including fiber reinforced composite products. It has been found that the introduction of powdered tabular alumina (aluminum oxide) into resin matrix compounds along with a compound useful to treat the surface of the aluminum oxide is effective in providing a curable resin compound surface coating with very high surface hardness, minimal shrinkage, and high temperature stability. The invention coating is superior in heat resistance, water resistance, solvent resistance, corrosion resistance, friction resistance, weather resistance, and provides superior adhesion, hardness and smoothness.

In the preferred embodiment, a suitable epoxy or other curable resin is mixed with tabular alumina and a surface modifier (coupling agent) from the group consisting of silanes, titanates, and zircoaluminates in proper concentration. The surface modifier gamma-Methacryloxypropyltrimethoxysilane has been used due to its availability at a favorable cost. The mixture provides a flowable resin matrix which after introduction of a catalyst and a promoting agent will provide a matrix which can be applied by spraying or other means onto a mold, pattern, part, or other surface to cure into a gel coat surface on a molded or other product. A wide range of resins suitable for gel coats for glass fiber reinforced products is found to be usable as a component of the preferred embodiment gel coat. An exemplary gel coat resin has a first component comprising polyester resin, vinyl benzene and silicon dioxide (amorphous). The first component is preferably 40–70 percent by weight of the total weight of the resin, while the vinyl benzene is in the range of 30–60 percent by weight of the resin. The resin composition is preferably as shown in the following table.

TABLE I

| Component | Wt. % |
| --- | --- |
| Polyester resin | 40–70 |
| Styrene Monomer (vinyl benzene) | 30–60 |
| Fumed silica (Silicon dioxide-amorphous) | 0–3 |

It will be appreciated that other formulations will be useful within the scope of the invention. Experimentation has been successful when polyester, vinyl ester, and epoxy resins constitute the resin to be filled.

Generally, a filler for a resin is not desired to be dense. However, to achieve suitable hardness, it is found that a hardener which has a specific gravity in the range 3.45 to 3.70, and in particular aluminum oxide ($Al_2O_3$), is the preferred filler material to achieve the desired hardness. The $Al_2O_3$ is provided as tabular alumina, in powder form, with particle size in the range of one to seven hundred microns.

The surface modifier employed in the preferred embodiment composition is from the group consisting of silanes, titanates, and zircoaluminates. The preferred embodiment gel coat has been prepared using the surface modifier gamma-Methacryloxypropyltrimethoxysilane in a proportion of 0.75 percent by weight of the total mixture. The surface modifier treats the surface of the particles of $Al_2O_3$ such that the particles will adhere properly to the resin matrix.

Pigment of choice is added to the compound if desired, in a range not exceeding two percent by weight. A promoting agent such as dimethyl aniline is optionally added to accelerate the curing of the resin when the catalyst is applied. An optional extending agent such a hydraquinine may also be employed in the mixture but none of the aforedescribed ingredients are essential to the invention.

The preferred embodiment composition comprises by weight the following:

TABLE II

| Component | Weight % |
| --- | --- |
| Resin | 25% ± 5% |
| gamma-Methacryloxypropyltrimethoxysilane | .75%–2.0% |
| Tabular Alumina | 75% ± 5% |
| Wollastonite ($CaSO_3$) | .5% ± 1% |

When the invention gel coat is to be used as a first layer applied to the mold, pattern, or other structure with the material described in U.S. Pat. No. 4,568,604 applied as an intermediate layer between the gel coat and a fiber reinforced resin layer, the invention gel coat is preferably impregnated with the product sold under the mark "KZ" by Ceramic Technologies Corp. of Rowley, Iowa, which consists of the mineral Wollastonite.

It should be understood that Wollastonite may be omitted from the mixture without loss of beneficial hardening effect but inclusion of the mineral is preferred.

The method for preparation of the preferred embodiment gel coat is the following:

The resin, gamma-Methacryloxypropyltrimethoxysilane, optional dimethyl aniline, optional pigment, optional extender, and Wollastonite are blended thoroughly in a suitable vessel. After thorough mixing, tabular alumina is added to the mixture until a desired viscosity of between 5,000 centipoise and 50,000 centipoise is achieved. A resin catalyst is introduced by any of several well known means such as nozzle injection at a rate of approximately 110 percent ±0.5 percent of the rate specified for incorporation of catalyst to a resin without filler, and the resulting curing matrix is sprayed or otherwise applied to the mold, pattern, part, or other surface. With the resin of the preferred embodiment, the selected catalyst is typically of the peroxide types. Choice of catalyst is dependent on the resin selected.

The preferred embodiment gel coat may also be applied as a polymer high durability coating for concrete panels, metal members, ceramic, wood and other structures to which a polymeric gel resin may be applied. The resulting cured surface is very hard and long wearing.

The product is capable of resulting in gel coat surfaces which may be used to produce parts with a class A auto finish (a/k/a "1000 Finish").

Because a range of gel coat resins may be employed, it is preferred that the gel time of the filled matrix be 20–25 minutes at 70°–80° F. The catalyst choice and its quantity may be adjusted to achieve the desired gel time for the filled resin.

It should be understood that the preferred embodiment includes Wollastonite as an ingredient. However, the preparation of the gel coat invention may be accomplished without introduction of Wollastonite when application of the gel coat is to be made on a surface which was not prepared with the filled resin layer of U.S. Pat. No. 4,568,604.

The gel coat resin invention may be stored in a closed container and has a shelf life of approximately ninety days. The stored product should be remixed and the appropriate catalyst added when use is desired. Alternatively the resin and gamma-Methacryloxypropyltrimethoxysilane mixture may be stored up to ninety days and the tabular alumina and Wollastonite introduced by mixing when the gel coat is ready to be applied.

It is expected that the gel coat invention may be employed in a wide range of applications including surfacing of foundry and production tooling, coatings for stamping and forming dies, for swimming pool linings, concrete coatings, steel coatings, auto body coatings, abrasion resistant coatings, asphalt roadway and portland cement roadway markings.

Having described the invention, I claim:

1. A sprayable outer gel coating for a surface, said coating consisting essentially of a mixture of a synthetic curable resin selected from the group consisting of a polyester and epoxy and combinations thereof, a chemical catalyst for curing said resin, and a filler, the filler comprising aluminum oxide in powder form present in an amount providing a mixture viscosity from 5,000 to 50,000 centipoise, and a surface treating agent.

2. The gel coating of claim 1 wherein
the surface treating agent is from the group consisting of silanes, titanates, and zircoaluminates.

3. The gel coating of claim 1 wherein the resin comprises approximately 20 to 30 percent by weight of the mixture, and the aluminum oxide comprises approximately 70 to 80 percent by weight of the mixture.

4. The gel coating of claim 1 wherein
the surface treating agent is gamma-Methacryloxypropyltrimethoxysilane.

5. The gel coating of claim 1 wherein
the resin comprises polyester resin, styrene, and fumed silica.

6. The gel coating of claim 1 wherein
the aluminum oxide is ground to a particle size of from one to 700 microns.

7. The gel coating of claim 3 wherein
the surface treating agent is from the group consisting of silanes, titanates, and zircoaluminates.

8. The gel coating of claim 7 wherein
the surface treating agent is gamma-Methacryloxypropyltrimethoxysilane.

9. The gel coating of claim 8 wherein
the resin comprises polyester resin, styrene, and fumed silica.

10. A resinous sprayable outer gel coating for a surface, said coating consisting essentially of a synthetic chemically curable polymer resin reactive to a chemical catalyst for curing said resin, mixed with a filler comprising an inorganic hardening agent in particulate form and a surface modifying agent to form a mixture, the hardening agent having a specific gravity in the range of 3.45 to 3.7 and present in said mixture in an amount providing said mixture with a viscosity of 5,000 to 50,000 centipoise.

11. The coating of claim 10 wherein said surface modifying agent is selected from the group consisting of silanes, titanates, and zircoaluminates, the resin comprises approximately 20 to 30. percent by weight of the mixture, and the hardening agent comprises approximately 70 to 80 percent by weight of the mixture.

12. The coating of claim 11 wherein
the hardening agent comprises aluminum oxide in powdered form.

13. The coating of claim 12 wherein
the surface treating agent is gamma-Methacryloxypropyltrimethoxysilane, the resin comprises polyester resin, styrene, and fumed silica, the aluminum oxide is ground to a particle size of from one to 700 microns.

* * * * *